June 12, 1934.   H. CHRÉTIEN   1,962,892
ANAMORPHOTIC LENS SYSTEM AND METHOD OF MAKING THE SAME
Filed Sept. 25, 1929

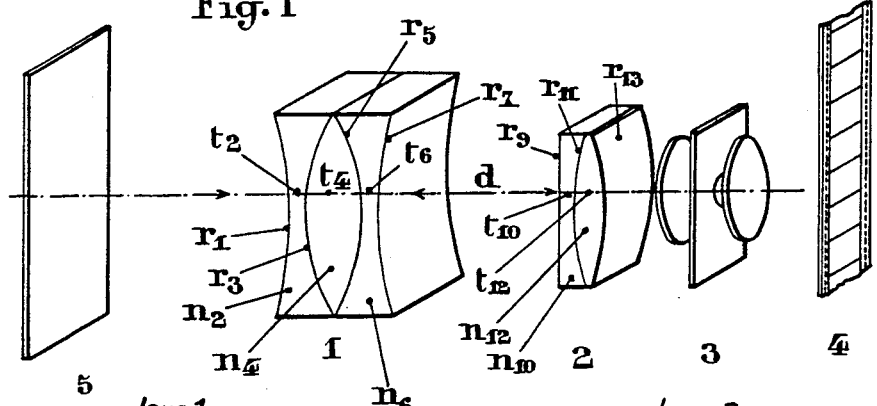

Fig. 1 lens 1
$r_1 = -90mm$ (radius of curvature)
$n_2 = 1,60476$ (index of refraction for D line)
$v_2 = 59,1$ (dispersive power)
$t_2 = 3mm$ (thickness)
$r_3 = 50mm$ (radius of curvature)
$n_4 = 1,62176$ (index of refraction for D line)
$v_4 = 36,0$ (dispersive power)
$t_4 = 14mm$ (thickness)
$r_5 = -50mm$ (radius of curvature)
$n_6 = 1,60476$ (index of refraction for D line)
$v_6 = 59,1$ (dispersive power)
$t_6 = 3mm$ (thickness)
$r_7 = 90mm$ (radius of curvature)

lens 2
$r_9 = \infty$ (plane surface)
$n_{10} = 1,60489$ (index of refraction for D line)
$v_{10} = 38,2$ (dispersive power)
$t_{10} = 3mm$ (thickness)
$r_{11} = 50mm$ (radius of curvature)
$n_{12} = 1,60476$ (index of refraction for D line)
$v_{12} = 59,1$ (dispersive power)
$t_{12} = 7mm$ (thickness)
$r_{13} = -90mm$ (radius of curvature)

$d = 61.3 mm$ (distance between lenses)

Fig. 2

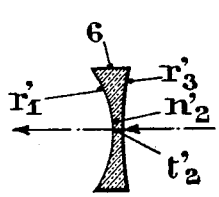
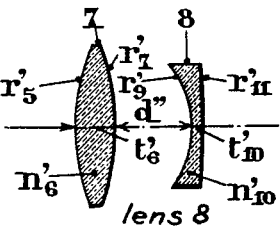

lens 6
$r'_1 = -60mm$ (radius of curvature)
$n'_2 = 1,50$ (index of refraction for D line)
$v'_2 = 66,6$ (dispersive power)
$t'_2 = 5mm$ (thickness)
$r'_3 = 280mm$ (radius of curvature)

$d' = 200mm$ (distance between lenses 6 and 7)

lens 7
$r'_5 = 100mm$ (radius of curvature)
$n'_6 = 1,50$ (index of refraction for D line)
$v'_6 = 66,6$ (dispersive power)
$t'_6 = 20mm$ (thickness)
$r'_7 = -100mm$ (radius of curvature)

$d'' = 50mm$ (distance between lenses 7 and 8)

lens 8
$r'_9 = -67mm$ (radius of curvature)
$n'_{10} = 1,65$ (index of refraction for D line)
$v'_{10} = 33,4$ (dispersive power)
$t'_{10} = 5mm$ (thickness)
$r'_{11} = -154mm$ (radius of curvature)

Alternate values for lens 7
$n''_6 = 1,60$ (index of refraction for D line)
$v''_6 = 60,0$ (dispersive power)

INVENTOR
Henri Chrétien
BY
Bartlett, Eyre, Scott & Keel
ATTORNEY

Patented June 12, 1934

1,962,892

UNITED STATES PATENT OFFICE 1,962,892

ANAMORPHOTIC LENS SYSTEM AND METHOD OF MAKING THE SAME

Henri Chrétien, Saint Cloud, France, assignor to Societe Technique d'Optique et de Photographie, Saint-Ouen, Seine, France Application September 25, 1929, Serial No. 395,045

14 Claims. (Cl. 88—57)

My invention relates to anamorphotic systems of lenses and has for its object the provision of a system that will give accurate, well defined images for projection or photographic purposes. An anamorphotic system is a combination of cylindrical lenses which give optical images whose magnification is different in different directions in the plane of the object. Such systems have heretofore been known and their use suggested for various purposes but prior to my present invention their field of use was extremely limited because of the practical impossibility of devising a lens system of this kind for the desired difference in magnification and for the particular use in the system desired and that will give sufficiently accurate definition. Hence such systems have been used previously only where it was of no great importance whether the produced image had accurate definition, as for example, for photography where comic, distorted effects were desired, or for telescopic use for laboratory research work. By my invention combinations of cylindrical lenses can be produced having suitable curvatures and thicknesses of glass as will enable motion pictures of highly accurate definiton to be taken or projected, although in such work there must be a wide field of view and a large aperture to secure luminosity. My invention comprises both a novel method whereby anamorphotic lens systems may be accurately devised and also lens systems of relatively simple construction particularly adapted for kinematography.

My novel method can best be made clear if a short description is first given of the usual methods of correcting for spherical aberration, coma, astigmatism, and distortion in spherical centered systems.

Rays emerging from any point on the field and passing through a centered spherical system of lenses and an aperture to the plane of the image will either meet in a point on the image field (in which case no inaccuracies are present) or they will intersect this plane in a spot, the size of which is a measure of the inaccuracies of the system. The known corrections to the system comprise the attempt to reduce this and similar spots to single points. To effect these corrections the components of the deviations of a point on the border of such a spot from the so-called Gaussian image of the object point are expanded into series containing increasing powers of the radius of the field and of the aperture; the coefficients of the various terms of the series being dependent upon the indices of refraction, curvatures, dispersive powers, etc. of the lenses. If an image is formed at all, the coefficient of the linear terms vanish. Furthermore, from symmetry, the coefficients of the even order terms must also vanish. There remains a formula of this type:

$\xi y = AH^3 + BH^2Y + CH^2Y + DY^3 +$ terms containing 5th, 7th etc. orders of Y and H where Y is the radius of the field, H the radius of the aperture, and $\xi y$ one component of the deviation in the image plane of the point in the border of the spot from the Gaussian image of the object point. The expression for the other component $\xi z$ will have a similar form, viz:

$\xi z = A'H^3 + B'H^2Y + C'HY^2 + D'Y^3 +$ terms containing 5th, 7th etc. orders of Y and H The first term of this series viz: $AH^3$ is called the "spherical aberration", the second term viz: $BH^2Y$ the "coma", the third term viz: $CH^2Y$ the "astigmatism" and the fourth term viz: $DY^3$ the "distortion".

Known expressions for each of these coefficients, A, B, C, and D are then written for the particular spherical system under consideration. The corrections then comprise equating the expressions for A, B and D each to zero to determine therefrom the desired curvatures, indices, etc. of the lenses.

In the above expression for $\xi y$, the coefficient C includes the curvature of the field of the so-called tangential image and in the similar series expansion for $\xi z$ the corresponding coefficient C' includes the curvature of the field of the co-called sagittal image. The corrections in spherical systems include equating the mean of these curvatures to zero.

For very accurate definition, such as is desired for motion picture work, it is not sufficient to correct only for the third order inaccuracies, but the higher order terms should also be taken into consideration. This I have usually done, and have taught may be accomplished, by taking the system as determined by the above described method, and computing therefrom for several different rays the intersections thereof on the image plane. From the data thus obtained a compromise is effected by reintroducing minute third order inaccuracies in order to diminish the higher orders of inaccuracies as are of such magnitude as would interfere with good definition.

As is apparent from the above description, the known methods of correcting for spherical centered systems are made possible by the symmetry of the system with the consequent disappearance of all of the inaccuracies of even orders. No comparable method for correcting cylindrical systems has heretofore been known, and for the case of cylindrical lenses having crossed generatices no comparable method is possible for in such systems inaccuracies of all orders higher than the first are present. Cylindrical lenses with crossed axes, which, as Abbe has shown in a classical series of tests, are the only conmbinations made up of cylindrical lens alone which give real images, are thus not suitable for kinematography.

Combinations of cylindrical lenses with their generating lines parallel and in the same plane, do not in general give an image, but virtual images may be formed upon proper choice of the focal lengths of the lens system. A virtual image is then formed at the so-called planes of Bravais, that is at planes where object and image coincide. By combining a system of positive and negative cylindrical lenses with their axial planes coincident with a spherical objective a real image of the virtual image may be formed upon a film or other sensitized surface, and the picture formed therefrom may then be projected through a similar optical system comprising spherical and cylindrical lenses. The problem of how to correct such a system for the high degree of definition required for kinematography has heretofore not been solved.

I have found that corrections to such an anamorphotic system may be made using the same formulæ as are used for spherical centered systems provided that certain variations from the usual methods are followed.

In the following outline of my method the variations from the method of correcting spherical systems will be made apparent:

I first consider the principal cross-section of the optical system. I then write the usual formulæ for A, B, and C as if the cross-section were of a spherical system. As the lens system is to be used for the production of distorted pictures which are then projected through a similar system in which the original relative dimensions are optically restored, I do not need to consider the coefficient D and hence do not equate it to zero as I would if following the procedure for spherical systems. The expression for each of the coefficients A and B I equate to zero as in the method of correcting for the spherical centered systems. Insofar as flatness of field is concerned, viz: astigmatism, instead of equating the mean of the expressions for the coefficients C and C' to zero, I have found that it is necessary to consider only the curvature of the tangential image, and hence equate the expression for the coefficient C alone to zero. The expression for the curvature of the tangential image of a spherical system corresponds to that for the image parallel to the axes of the cylindrical system having the same cross-section. It will be understood, therefore, that the term "tangential image" as used in the present application and claims refers to the expression in the formulæ for the hypothetical spherical centered system.

From the above method what may be termed a first approximation of a system is determinable, it being assumed that convenience of manufacture and ranges of available indices of refraction and dispersion, etc. have made the problem determinate. Additional formulæ from which the approximate system is determinable are derived by the differentiation of the expressions for the magnification, aberration, coma and curvature of tangential image with respect to the wave length to correct for chromatic aberration.

Having now found a system by the above method in which a cross-section only was considered, I now consider rays entering the system obliquely from discrete points on the field some of which are out of the axial plane. To actually follow the path of such an oblique ray through my system would be a most involved and complicated procedure and one which would present such difficulties as to make it impracticable. I have found, however, that the procedure can be simplified and made practicable as it is necessary only to consider the projection of such an oblique ray upon a cross-section, provided a fictitious index of refraction is used in the computation in place of the index of refraction of each lens of the system as previously determined. The fictitious index of refraction $n$ is given by the formula:

$$\bar{n}=\sqrt{n^2+(n^2-1)\tan^2\gamma}$$

where $n$ is the index of refraction as previously determined and $\gamma$ is the angle between the ray and the cross-section. This formula holds good irrespective of the azimuth of the ray.

Having now determined the inaccuracies of this approximate system by locating on the image plane a series of points of intersections of rays coming from each of several points on the field, I introduce into the original formulæ of the spherical system such numerical values as will reduce as far as possible the inaccuracies of the system and determine anew the constants of the system which will be found to be slightly different from those of the approximate system.

My method, as described above, is characterized by the fact that I correct for the curvature of the tangential image, that I neglect distortion, and that I correct for oblique rays incident at an angle $\gamma$ as if they were not oblique but passed directly through glass having a fictitious index of refraction given by the formula:

$$\bar{n}=\sqrt{n^2+(n^2-1)\tan^2\gamma}$$

For specific lens systems constructed according to my invention reference may be had to the accompanying drawing of which:

Fig. 1 illustrates an anamorphotic lens system particularly adapted for taking motion pictures, and Fig. 2 illustrates a system particularly adapted for projection.

In Fig. 1 a system comprising the compound negative cylindrical lens 1 and the compound positive cylindrical lens 2 is illustrated. The distance between the lenses 1 and 2 is represented by $d$. The lens system is inserted in front of the spherical objective 3 and film 4. The numeral 5 represents the object field when the system is used for taking pictures. When the system is used for projection, the numeral 5 may be taken as indicating the screen. For convenience in manufacture certain of the curvatures were chosen equal, viz: $r_1$, $r_7$ and $r_{13}$, also $r_3$, $r_5$ and $r_{11}$. $r_9$ was chosen as infinite. Also for convenience the indices of refraction $n_2$, $n_4$ and $n_6$ were assumed nearly equal as were $n_{10}$ and $n_{12}$. This latter assumption as to substantial equality of indices of refraction of elements of a compound lens is of value in that it eliminates the necessity of great care in the formation of the internal surfaces.

A table is given below of the constants of the cylindrical system of Fig. 1 as computed by my method for a magnification of about 2. It will be noted that the indices of refraction of the different lenses differ only slightly, each having a value close to 1.6.

TABLE I

Lens 1

$r_1 = -90$ mm. (radius of curvature)
$n_2 = 1.60476$ (index of refraction for D line)
$v_2 = 59.1$ (dispersive power)
$t_2 = 3$ mm. (thickness)
$r_3 = 50$ mm. (radius of curvature)
$n_4 = 1.62176$ (index of refraction for D line)
$v_4 = 36.0$ (dispersive power)
$t_4 = 14$ mm. (thickness)
$r_5 = -50$ mm. (radius of curvature)
$n_6 = 1.60476$ (index of refraction for D line)
$v_6 = 59.1$ (dispersive power)
$t_6 = 3$ mm. (thickness)
$r_7 = 90$ mm. (radius of curvature)
$d = 61.3$ mm. (distance between lenses)

Lens 2

$r_9 = \infty$ (plane surface)
$n_{10} = 1.60489$ (index of refraction for D line)
$v_{10} = 38.2$ (dispersive power)
$t_{10} = 3$ mm. (thickness)
$r_{11} = 50$ mm. (radius of curvature)
$n_{12} = 1.60476$ (index of refraction for D line)
$v_{12} = 59.1$ (dispersive power)
$t_{12} = 7$ mm. (thickness)
$r_{13} = -90$ mm. (radius of curvature)

For a lens system of the type of Fig. 1, viz:

when $r_1 = -r_7 = r_{13}$ and $r_3 = r_5 = r_{11}$ with $r_9 = \infty$ and when $n_2 = n_4 = n_6$ and $n_{10} = n_{12}$, my method of computing shows that the correct system will be one on which all of the indices of refraction are substantially equal and that this value is dependent only upon the magnification; the relation being as follows:

$$\Gamma = \frac{n^3 - n^2 - \left(\frac{1}{4}\right)n + \frac{1}{2}}{n^3 - 2n^2 + 2}$$

where $\Gamma$ is angular magnification in the direction from film to object or screen.

In Fig. 2 a system comprising the simple cylindrical lenses 6, 7 and 8 is shown in section. This system has been constructed according to my method and is particularly adapted for use in projection of pictures. When so used it is located as is the cylindrical system of Fig. 1, viz., between the spherical objective and the screen upon which the pictures from the film are to be projected. The constants of the system of Fig. 2, the magnification being about 2, are given in the following table:

TABLE II

Lens 6

$r'_1 = -60$ mm. (radius of curvature)
$n'_2 = 1.50$ (index of refraction for D line)
$v'_2 = 66.6$ (dispersive power)
$t'_2 = 5$ mm. (thickness)
$r'_3 = 280$ mm. (radius of curvature)
$d' = 200$ mm. (distance between lenses 6 and 7)

Lens 7

$r'_5 = 100$ mm. (radius of curvature)
$n'_6 = 1.50$ (index of refraction for D line)
$v'_6 = 66.6$ (dispersive power)
$t'_6 = 20$ mm. (thickness)
$r'_7 = -100$ mm. (radius of curvature)
$d'' = 50$ mm. (distance between lenses 7 and 8)

Lens 8

$r'_9 = -67$ mm. (radius of curvature)
$n'_{10} = 1.65$ (index of refraction for D line)
$v'_{10} = 33.4$ (dispersive power)
$t'_{10} = 5$ mm. (thickness)
$r'_{11} = -154$ mm. (radius of curvature)

Alternate values for lens 7

$n''_6 = 1.60$ (index of refraction for D line)
$v''_6 = 60.0$ (dispersive power)

From the above table it will be noticed that the ratio of the dispersive power of lens 6 to that of lens 8 is substantially equal to 2, which is substantially the value of the angular magnification for the system. This relationship, viz., that the ratio of the dispersive powers of the first and third lenses of a system of three simple spaced cylindrical lenses is of the same order as the angular magnification, is found from my method to hold true, irrespective of the particular value of the magnification. This fact is of considerable aid in determining the proper lens system for projection. It is found to be important for the dispersive powers of the first two lenses of the system, viz., lens 6 and 7, to be approximately equal.

The lens system illustrated in each of Figs. 1 and 2 when used in a camera give an image upon the film which is optically compressed in one direction and, when used in a projector, project upon the screen an image which is optically distended in the same direction so as to restore the original relative dimensions of the object. Hence in the above description of the constants of the specific systems illustrated it will be appreciated that the angular magnification, being stated as greater than unity, referred to the magnification in the direction from film to object field or screen, that is, in the direction from the nearer to the farther conjugate points of the whole system: anamorphoser plus ordinary photographic lens. Obviously if this angular magnification is greater than unity, as specified for the illustrated systems, the angular magnification in the opposite direction is less than unity.

I have now described my novel method of devising anamorphotic lens systems and have given two specific examples of such systems. In each of the anamorphotic lens systems illustrated the angular magnification in the direction from film to object field or screen is greater than unity as each system comprises a negative system facing the farther conjugate point and a positive system facing the nearer conjugate points of the whole system including the anamorphoser and spherical objective. In Fig. 1 the positive and negative systems are each compound lenses. In Fig. 2 the negative system is a simple negative lens (lens 6) and the positive system is a pair of spaced positive and negative lenses (lenses 7 and 8) which together form the positive system equivalent to the positive system of Fig. 1.

What I claim is:

1. An anamorphotic system including spaced positive and negative cylindrical lens systems having their generating lines parallel, the negative lens system being faced toward the further conjugate focus and said anamorphotic system having constants such as indices of refraction, curvatures, etc. so related as to cause the curvature of the field of the tangential image to be substantially equal to zero.

2. A lens system according to claim 1 wherein each of said positive and negative cylindrical systems comprises a compound lens.

3. A lens system according to claim 1 wherein said negative cylindrical system comprises a simple lens and said positive cylindrical system comprises two simple spaced lenses of which one is positive and one negative.

4. An anamorphotic lens system comprising in combination a spherical objective and spaced convex and concave cylindrical lens systems having their axial planes coincident, the negative lens system being faced toward the further conjugate focus and said system having constants such as indices of refraction, curvatures, etc. of such values relative to the objective and aperture thereof as to have the chromatic aberration, coma, spherical aberration and curvature of the tangential image each substantially eliminated.

5. An anamorphotic lens system for projection including two simple negative cylindrical lenses and a simple positive cylindrical lens, the positive lens being spaced between the negative lenses and all three cylindrical lenses having their axial planes coincident, the ratio of the dispersing power of the first negative lens of the system to the last negative lens of the system being of the same order as the angular magnification of the system.

6. An anamorphotic lens system for projecting including two simple negative cylindrical lenses and a simple positive cylindrical lens, the positive lens being spaced between the negative lenses and all three cylindrical lenses having their axial planes coincident, the first negative lens and the positive lens having substantially equal dispersive powers and the last negative lens having a dispersive power less than that of the other two lenses.

7. An anamorphotic lens system according to claim 6 wherein the two lenses having equal dispersive powers are constructed of glass having equal indices of refraction.

8. An anamorphotic lens system for projection comprising a spherical objective, three spaced simple cylindrical lenses in front of the objective, the center lens of said system being a double convex lens, and the axial planes of the cylindrical lenses being coincident.

9. An anamorphotic lens system in which the curvature of the field of the tangential image is substantially equal to zero comprising a spherical objective and spaced converging and diverging cylindrical lenses having parallel generating lines, said converging lens being plano-convex and said diverging lens being double concave and the radii of curvature of the curved surfaces of said cylindrical lenses being equal.

10. An anamorphotic lens system in which the curvature of the field of the tangential image is equal to zero comprising spaced converging and diverging cylindrical lenses having parallel generating lines, the indices of refraction of all the glasses being substantially equal, said converging lens being plano-convex and said diverging lens being double concave and the radii of curvature of the curved surfaces of said cylindrical lenses being equal.

11. An anamorphotic lens system in which the curvature of the field of the tangential image is equal to zero comprising a spherical objective and spaced converging and diverging cylindrical lenses having parallel generating lines, the indices of refraction of all the glasses being substantially equal to 1.6 said converging lens being plano-convex and said diverging lens being double concave and the radii of curvature of the curved surfaces of said cylindrical lenses being equal.

12. An anamorphotic lens system in which the curvature of the field of the tangential image is equal to zero comprising spaced converging and diverging cylindrical lenses having parallel generating lines, the indices of refraction of all the glasses being substantially equal, said converging lens being plano-convex while said diverging lens is double concave, said cylindrical lenses having substantially the same index of refraction and the magnification of the system in the direction from the nearer to the further conjugate focus being related to the index of refraction by the equation $$\Gamma = \frac{n^3 - n^2 - (1/4)n + 1/2}{n^3 - 2n^2 + 2}$$

where $\Gamma$ is the magnification and $n$ the index of refraction.

13. The anamorphotic lens system according to claim 12 wherein the indices of refraction of all of the glasses are substantially equal to 1.6.

14. A lens system according to claim 1 wherein said positive system comprises a single compound lens.

HENRI CHRÉTIEN.

Certificate of Correction

Patent No. 1,962,892.  June 12, 1924

HENRI CHRÉTIEN

It is hereby certified that errors appear in the printed specification of the above numbered patent requiring correction as follows: Page 2, line 5, for the syllable "conmbina-" read *combina-*; and line 90, for the italicized "$n$" read $\bar{n}$; page 3, line 31, for "on" read *in*; and line 39, before "angular" insert *the*; page 4, line 14, claim 5, for "dispersing" read *dispersive*; and that the said Letters Patent should be read with these corrections therein that the same may conform to the record of the case in the Patent Office.

Signed and sealed this 3d day of July, A. D. 1934.

[SEAL]

BRYAN M. BATTEY,
*Acting Commissioner of Patents.*